United States Patent
Le et al.

(10) Patent No.: US 11,973,769 B1
(45) Date of Patent: Apr. 30, 2024

(54) AUTO-ENCODERS FOR ANOMALY DETECTION IN A CONTROLLER AREA NETWORK (CAN)

(71) Applicant: BAE Systems Information and Electronic Systems Integration Inc., Nashua, NH (US)

(72) Inventors: Vu T. Le, Chantilly, VA (US); Elena E. Novikova, Fairfax, VA (US); Matvey Yutin, Fairfax, VA (US); Michael J. Weber, Warrenton, VA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 649 days.

(21) Appl. No.: 17/111,662

(22) Filed: Dec. 4, 2020

Related U.S. Application Data

(60) Provisional application No. 62/972,942, filed on Feb. 11, 2020.

(51) Int. Cl.
H04L 9/40 (2022.01)
(52) U.S. Cl.
CPC ...... *H04L 63/1416* (2013.01); *H04L 63/1408* (2013.01); *H04L 63/1425* (2013.01); *H04L 63/1466* (2013.01)
(58) Field of Classification Search
CPC .......... H04L 63/1408; H04L 63/1425; H04L 63/1466
See application file for complete search history.

(56) References Cited

U.S. PATENT DOCUMENTS

2017/0072850 A1* 3/2017 Curtis ................ G08G 1/166
2019/0025813 A1* 1/2019 Cella ................. H04B 17/309
(Continued)

OTHER PUBLICATIONS

Omid Avatefipour et al, An Intelligent Secured Framework for Cyberattack Detection in Electric Vehicles' CAN Bus Using Machine Learning, IEEE Access 7 (2019), 127580-127592.
(Continued)

*Primary Examiner* — Joseph P Hirl
*Assistant Examiner* — Thomas A Gyorfi
(74) *Attorney, Agent, or Firm* — Gary McFaline; Finch & Maloney PLLC

(57) ABSTRACT

An anomaly detection system is disclosed. In an embodiment, the anomaly detection system includes an anomaly detection module and a warning indicator module. The anomaly detection module includes one or more auto-encoders that receive sensor data from a plurality of sensors. Each of the one or more auto-encoders receives sensor data from at least three different sensors of the plurality of sensors. By receiving data output from at least three of the sensors, the auto-encoder can recognize expected inter-related patterns from the sensor output. The warning indicator module compares an output of a given auto-encoder of the plurality of auto-encoders to an input of the given auto-encoder to obtain an error value, and then compares that error value against an error threshold. In response to the error value exceeding the error threshold, the warning indicator module issues a warning signal associated with the sensor data received by the given auto-encoder.

25 Claims, 7 Drawing Sheets

(56) References Cited

U.S. PATENT DOCUMENTS

| | | | | |
|---|---|---|---|---|
| 2019/0379683 | A1* | 12/2019 | Overby | H04W 12/122 |
| 2020/0364579 | A1* | 11/2020 | Misu | G06N 3/084 |
| 2021/0026359 | A1* | 1/2021 | MacGregor | G05D 1/0088 |
| 2021/0046923 | A1* | 2/2021 | Olson | G05D 1/0214 |
| 2021/0094553 | A1* | 4/2021 | Lee | H04L 12/40176 |

OTHER PUBLICATIONS

Safa Boumiza and Rafix Braham, An Efficient Hidden Markov Model For Anomaly Detection in CAN Bus Networks, 2019 International Conference on Software, Telecommunications and Computer Networks (SoftCOM) (Sep. 2019).

Guy Bruneau, The History and Evolution of Intrusion Detection (2019).

Steve Corrigan, Introduction to the Controller Area Network (CAN), Texas Instruments (2019).

Roderick Currie, Developments in Car Hacking (2016).

Herve Debar and Andreas Wepsi, Aggregation and Correlation of Intrusion-Detection Alerts, International Workshop on Recent Advances in Intrusion Detection (2001), Springer, 85-103.

Benedikt Ferling et al., Intrusion Detection for sequence-based attacks with reduced traffic models, 19th International GI/ITG Conference on Measurement, Modelling and Evaluation of Computing Systems (Feb. 2018).

Sebastian Genereux et al., MAIDENS: MIL-STD-1553 Anomaly-Based Intrusion Detection System Using Time-Based Histogram Comparison, IEEE Trans. Aerospace Electron. Systems (Apr. 2019).

Mabrouka Gmiden et al., An Intrusion Detection Method for Securing In-Vehicle CAN bus, 17th International Conference on Sciences and Techniques of Automatic Control and Computer Engineering (STA2016) (Dec. 2016), 19-21.

Bogdan Groza and Pal-Stefan Murvay, Efficient Intrusion Detection With Bloom Filtering in Controller Area Networks. IEEE Transactions on Information Forensics and Security (Apr. 2019), 1037-1051.

Markus Hanselmann et al., CANet: An Unsupervised Intrusion Detection System for High Dimensional CAN Bus Data, arXiv preprint arXiv:1906.02492 (2019).

Markus Hanselmann et al., SynCAN Dataset, (2019).

Tobias Hoppe et al., Applying Intrusion Detection to Automotive IT—Early Insights and Remaining Challenges, Journal of Information Assurance and Security 4 (2009), 226-235.

Shangzhu Jin et al., Intrusion Detection System Enhanced by Hierarchical Bidirectional Fuzzy Rule Interpolation, 2018 IEEE International Conference on Systems, Man, and Cybernetics (2018).

Min-Joo Kang and Je-Won Kang, Intrusion Detection System Using Deep Neural Network for In-Vehicle Network Security, PLoS One 11(6) (Jun. 2016).

Diederik P. Kingma and Jimmy BA, Adam: A Method for Stochastic Optimization, Proceedings of 3rd International Conference on Learning Representations (ICLR 2015) (2015).

Siti Lokman et al., Intrusion detection system for automotive Controller Area Network (CAN) bus system: a review, EURASIP Journal on Wireless Communications and Networking (2019).

Jiayan Zhang et al., Intrusion detection system using deep learning for in-vehicle security, Ad Hoc Networks 95 (Dec. 2019).

Elena I Novikova et al., Auto Encoders for CAN Bus Anomaly Detection in Ground Vehicles, American Institute of Aeronautics and Astronautics (2020).

Adam Paszke et al., Pytorch: An Imperative Style, High Performance Deep Learning Library, Proceedings of 33rd Conference on Neural Information Processing Systems (NeurIPS 2019) (2019).

Roland Rieke et al., Behavior Analysis for Safety and Security in Automotive Systems, Proceedings of 25th Euromicro International Conference on Parallel, Distributed and Network-basedProcessing, PDP2017 (Mar. 2017).

Hyun Min Song et al., Intrusion Detection System Based on the Analysis of Time Intervals of CAN Messages for In-Vehicle Network, 2016 International Conference on Information Networking (ICOIN) (Jan. 2016), 63-68.

Orly Stan et al., Protecting Military Avionics Platforms from Attacks on MIL-STD-1553 Communication Bus. (2017).

Ivan Studnia et al., A language-based intrusion detection approach for automotive embedded network, Proceedings of 21st IEEE Pacific Rim International Symposium on Dependable Computing, IEEE 2015 (2015).

Adrian Taylor et al., Frequency-Based Anomaly Detection for the Automotive CAN Bus, Proc. World Congress on Industrial Control Systems Security (2015), 45-49.

Andrew Tomlinson et al., Detection of Automotive CAN Cyber-Attacks by Identifying Packet Timing Anomalies in Time Windows, Proceedings of 48th Annual International Conference on Dependable Systems and Networks Workshops (2018).

Chris Valasek and Charlie Miller, Adventures in Automotive Networks and Control Units. Technical Paper, IOActive, Inc. (2014).

Mahmood Yousefi-Azar et al., Autoencoder-based Feature Learning for Cyber Security Applications, 2017 International Joint Conference on Neural Network (IJCNN) (2017).

* cited by examiner

AUTO-ENCODERS FOR ANOMALY DETECTION IN A CONTROLLER AREA NETWORK (CAN)

CROSS REFERENCE TO RELATED APPLICATIONS

This Application Claims the benefit of U.S. Provisional Patent Application Ser. No. 62/972,942 filed Feb. 11, 2020, the contents of which are incorporated herein by reference.

BACKGROUND

Communications security on a Controller Area Network (CAN) is important for the safe operation of any vehicle or device where it is used. CAN was designed to enable communications between multiple electronic control units (ECUs), sensors, and other devices. CAN bus topology is configured such that each node on the bus receives every message sent from every other node and can also send a message to any other node on the bus. As will be appreciated in light of this disclosure, such a topology can be at risk of cyberattacks due to the lack of message authentication and integrity checks. Possible attacks include, for instance, rogue node manipulation or injection of message content to cause unexpected or damaging sensor readings (e.g., over-writing temperature or pressure gauge readings) or operator confusion (e.g., changing dashboard gauge values or illuminating warning lamps). One possible approach to cyber-attack detection is packet-based, which may work for detection of flood and other noisy type attacks. However, sophisticated packet manipulation attacks are difficult or impossible to detect using such packet-based approaches since the attacker's changes are happening deeper, at the signal level, inside a given packet. Accordingly, there are many non-trivial challenges with respect to correctly identifying and mitigating cyber-based attacks in the CAN environment.

BRIEF DESCRIPTION OF THE DRAWINGS

Features and advantages of embodiments of the claimed subject matter will become apparent as the following Detailed Description proceeds, and upon reference to the Drawings, in which:

Figure 1:
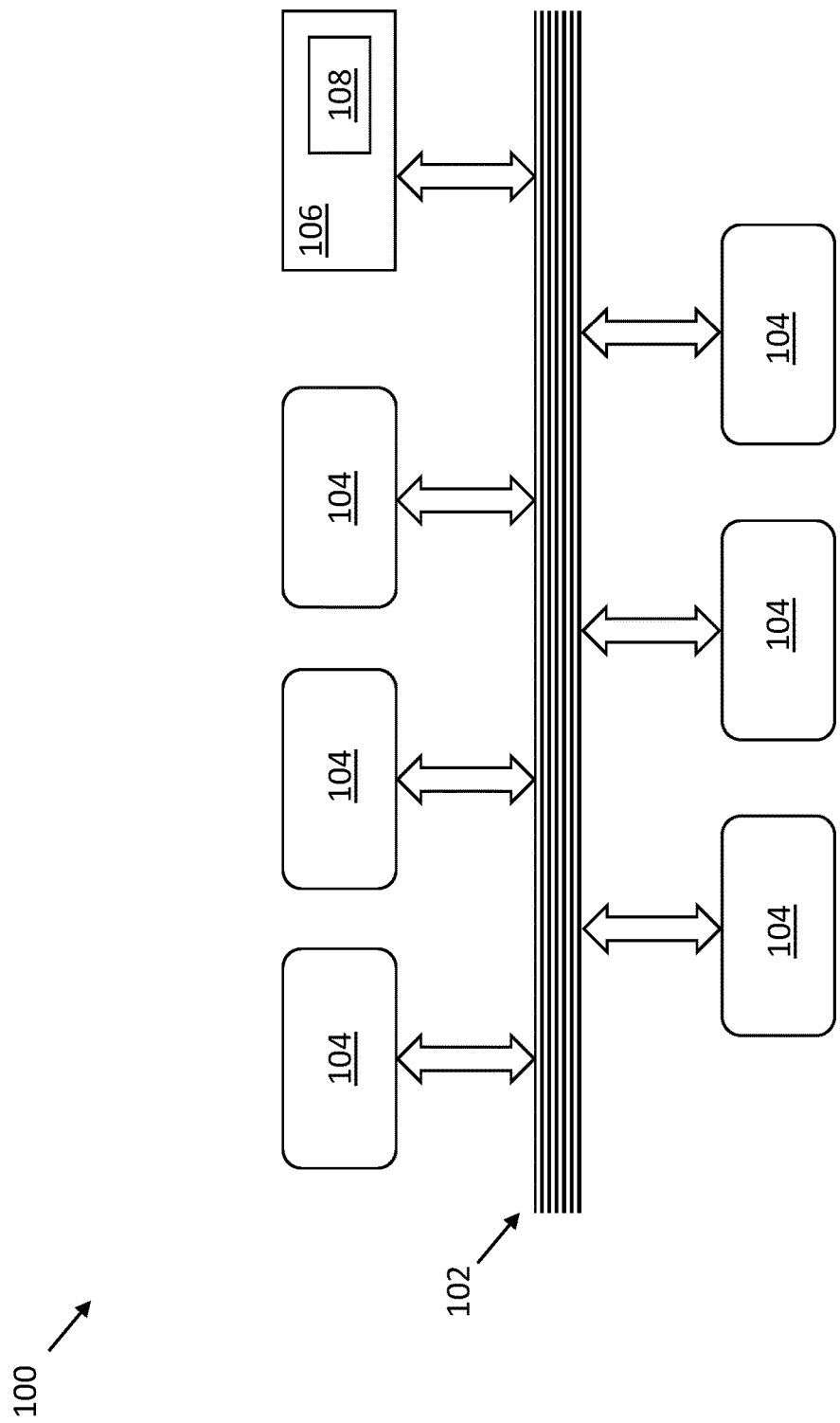
FIG. 1 illustrates a schematic diagram of a Controller Area Network (CAN) environment configured with an anomaly detection system, in accordance with an embodiment of the present disclosure.

Although the following Detailed Description will proceed with reference being made to illustrative embodiments, many alternatives, modifications, and variations thereof will be apparent in light of this disclosure.

DETAILED DESCRIPTION

An anomaly detection system is disclosed. The anomaly detection system is particularly well-suited for identifying cyber-attacks in a Controller Area Network (CAN) environment, such as a CAN used on a vehicle to facilitate communication amongst the various sensors and other electronic devices. Other applications that are capable of detecting signal anomalies among a plurality of sensors and prone to cyberattacks can also benefit from the techniques provided herein, as will be apparent. In an embodiment, the anomaly detection system includes an anomaly detection module and a warning indicator module. The anomaly detection module includes a plurality of auto-encoders that receive sensor data from a plurality of sensors, such as sensors on a CAN. Each auto-encoder of the plurality of auto-encoders receives sensor data from at least three different sensors of the plurality of sensors. By receiving data output from at least three of the CAN sensors, the auto-encoder can recognize expected inter-related patterns from the sensor output. The warning indicator module compares an output of a given auto-encoder of the plurality of auto-encoders to an input of the given auto-encoder to obtain an error value. In response to the error value being greater than (or otherwise exceeding) an error threshold, the warning indicator module is triggered or otherwise engaged to issue a warning signal associated with the sensor data received by the given auto-encoder. The warning signal can, for example, alert an operator or the CAN itself (such as an intelligent asset of the CAN) of an anomaly with the sensor output associated with the given auto-encoder. The anomaly may be present, for instance, due to a cyberattack or due to sensor malfunction. In any case, the informed operator or CAN may then take appropriate action.

Using auto-encoders to recognize patterns between signals is a more sensitive method of identifying cyberattacks compared to range-based or frequency-based detectors, and even further, it can be generalized to environments other than the one used to collect the training data. This generalization is possible because the anomaly detection system, having embodiments described herein, detects patterns of correlation between signals, and not their absolute values. To this end, and according to one such embodiment, the anomaly detection system is able to discriminate modifications made to a signal even when those modifications do not exceed values, rates of change, or other normal bounds with respect to that one signal. This capability raises the sensitivity of the network environment to cyberattacks and makes it more difficult for attackers to go undetected if they manipulate physical sensor data on the network bus for the purposes of misleading control systems or human operators. The anomaly detection also raises the sensitivity of the network environment to malfunctions, as will be appreciated.

Techniques described herein also provide practical and efficient solutions to cyber threats compared to other possible techniques such as hardening each of the (potentially thousands of) components that can make up the CAN environment. Other network security techniques are not adapted to operate on the communications networks commonly employed by commercial and defense platforms. Further, other approaches to cyber security do not work as they are signature-based and not suited to protect non-traditional systems. For example, other techniques, such as those using rules-based approaches for detection (such as anti-virus software or other such tools that require advance knowledge of a given threat), would not identify an unknown attack as being malicious since there would not be a rule for it (e.g., a known signature to look for).

As will be further appreciated, in one or more embodiments, the anomaly detection system as variously provided herein can be adapted for use on bus architecture (e.g., for a serial data bus) such as the CAN environment sometimes used on ground-based vehicles in the defense industry. However, the present disclosure is not limited thereto. In other embodiments, the anomaly detection system is adapted to other architectures, such as MIL-STD-1760 (electrical interface between a military aircraft and its weapons, electronic devices, disposable tanks, and other stores), MIL-STD-1773 (optical fiber bus), Aeronautical Radio, Incorporated (ARINC) standards (such as ARINC 429, directed to an avionics serial bus and corresponding protocol), RS-232 (serial data transmission), RS-485 (serial communications drivers and receivers), and other architectures relevant to both military and commercial platforms. For example, in some embodiments, applications extend beyond communication security of a CAN environment to include mission networks, control system networks, and the like.

Thus, and according to an embodiment of the present disclosure, a controller area network (CAN) includes a plurality of sensors, a data bus coupled to the plurality of sensors, and a processing device coupled to the data bus. The sensors may be any sensors found on a vehicle or any other user-operated device. In some embodiments, the sensors may be coupled to an unmanned vehicle. Examples of sensors include fuel gauges, speedometers, temperature sensors, oxygen sensors, chemical sensors, radiation sensors, odometers, stress/strain gauges, potentiometers, and gyroscopes, to name a few examples. The sensors can communicate with one another, with other electronic devices or actuators, and/or with any number of processing devices coupled to the data bus. At least one of the processing devices on the data bus includes a trained anomaly detection system as variously provided herein, and that is designed to monitor the output from the various sensors on the data bus and provide a warning or warnings if an anomaly is detected with one or more of the sensors. The anomaly detection system uses a plurality of auto-encoders, with each of the plurality of auto-encoders designed to receive the output from a subset of the sensors. The auto-encoders may be trained on data received from their associated sensors over a period of time to recognize inter-related patterns from the data indicative of normal operation. Once the pattern is established by an auto-encoder, the output of the auto-encoder is roughly equal to the input within some acceptable tolerance. If the pattern between the sensor data suddenly changes, for example, due to a cyberattack on one of the sensors, the auto-encoders can quickly identify (e.g., output no longer equals the input) that an anomaly is present and issue a warning signal or signals. In some embodiments, the warning issued by the anomaly detection system is stored on any electronic storage device along with a timestamp of when the warning occurred. The stored warning may also be accompanied by other related data, such as a copy of the sensor output flagged as being anomalous. Numerous variations and alternative embodiments will be appreciated in light of this disclosure.

Controller Area Network Overview

FIG. 1 illustrates at least a portion of a controller area network (CAN) 100 for use within a multi-sensor environment, according to an embodiment. CAN 100 may be adapted for use on a manned or unmanned vehicle, such as a ground, air, or sea vehicle. According to some embodiments, CAN 100 includes a data bus 102 coupled to a one or more sensors 104 and at least one processing device 106.

As used herein, the terms "processor" or "processing device" may refer to any device or portion of a device that processes electronic data from registers and/or memory to transform that electronic data into other electronic data that may be stored in registers and/or memory, and/or to make determinations and/or decisions based on that electronic data. Processing device 106 may include one or more digital signal processors (DSPs), application-specific integrated circuits (ASICs), field programmable gate arrays (FPGAs), central processing units (CPUs), graphics processing units (GPUs), crypto-processors (specialized processors that execute cryptographic algorithms within hardware), server processors, custom-built semiconductor, or any other suitable processing devices. In a more general sense, any processing entity suitable for a network controller can be used.

Data bus 102 may be a data bus (e.g., serial or parallel) and may represent two or more busses, for example, to provide redundancy in case of damage or failure to one or more of the busses. According to an embodiment, each of the devices coupled to data bus 102 can communicate with any other device coupled to data bus 102. That is, any of sensors 104 can communicate with one another and any of sensors 104 can communicate with processing device 106. Other electronic devices, such as actuators or other electronic control units (ECUs) may also be coupled to data bus 102 and would similarly be capable of communicating across data bus 102 to any other device coupled thereto. This level of open communication among the various devices on data bus 102 may be susceptible to cyberattacks since the data being transferred between devices typically lacks any authentication or integrity checking.

Each of sensors 104 may provide associated sensor data on data bus 102. Example sensor data may depend on the environment in which CAN 100 is used. For example, aircraft may include numerous sensors that provide sensor data in the form of altitude measurements, angle-of-attack (AOA) measurements, yaw/pitch/roll measurement, cargo weight, speed, power, temperature, pressure, etc. Ground vehicles may include sensors that provide sensor data in the form of a global position, road condition metrics, speed, torque, power, gear ratios, etc. In any case, each of sensors 104 can provide any type of sensor output either continuously, periodically, or semi-periodically.

The sensor data may be received by processing device 106 for further analysis or presentation. According to an embodiment, processing device 106 can include an anomaly detection system 108 implemented in hardware, software, or a combination of both. Anomaly detection system 108 receives the sensor data output and may also receive output from other ECUs coupled to data bus 102. According to some embodiments, anomaly detection system 108 observes the data being sent across data bus 102 and issues and/or stores warnings if any anomalies are detected in the data.

Figure 2:
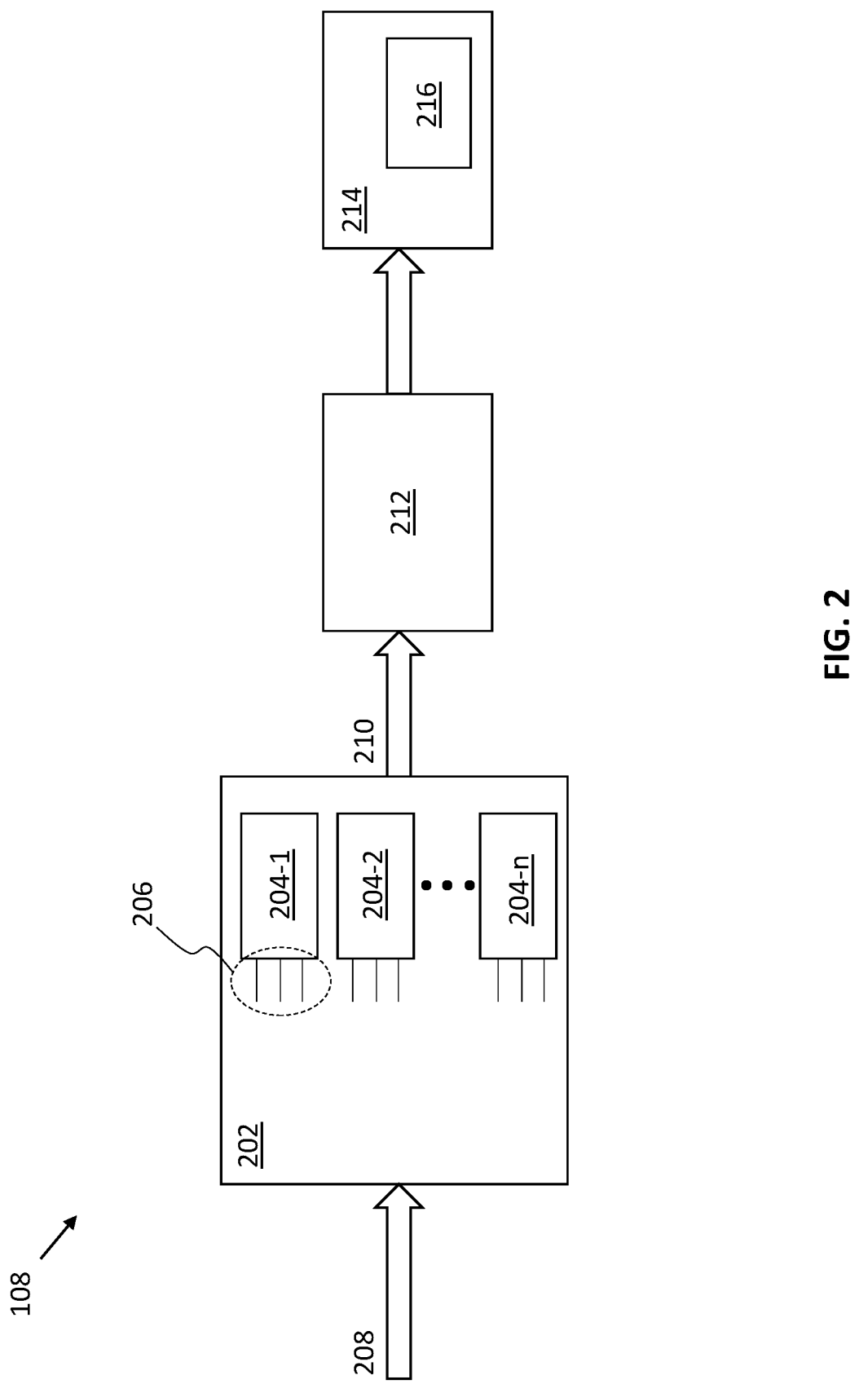
FIG. 2 illustrates a block diagram of an anomaly detection system for use with the CAN environment of FIG. 1, in accordance with an embodiment of the present disclosure.

FIG. 2 illustrates a schematic representation of anomaly detection system 108 in more detail, according to an embodiment of the present disclosure. The core of anomaly detection system 108 is the anomaly detection module 202 which in this example embodiment includes a plurality of n auto-encoders 204-1-204-n. Each auto-encoder may be designed to work independently from all other auto-encoders. Additionally, each of auto-encoders 204 receives input 206 from at least three of the sensors 104. In other embodiments there may be a single auto-encoder 204 that receives input from two or more sensors, although other example variations will be apparent.

In more detail, an according to some such embodiments, anomaly detection module 202 receives the sensor output 208 from each of the plurality of sensors 104. The sensor output from a given sensor 104 is then routed by anomaly detection module 202 to the input 206 of one or more of the auto-encoders 204, such that each auto-encoder 204 receives a sensor data group. For example, if sensor output from 100 different sensors was received as sensor output 208 at anomaly detection module 202, then each of the 100 outputs may be fed into the input of one or more of auto-encoders 204. Some of the sensor outputs may only be fed to a single auto-encoder 204 while other sensor outputs are fed to more than one auto-encoder. In some embodiments, some of the sensor outputs are not fed to any of auto-encoders 204. However, each of the auto-encoders 204 receives sensor data from a limited number of sensors to form its sensor data group (e.g., from only three sensors). Further discussion of the architecture of the auto-encoders 204, is provided with reference to FIGS. 3 and 4.

The auto-encoder output 210 is received by a warning indicator module 212 that is designed to receive the output generated from each auto-encoder and compare the output from the auto-encoder to its input. Due to the architecture and training of each of the auto-encoders 204, the output should be within a given threshold tolerance of the input if the sensors are operating normally. For example, the output of a first auto-encoder 204-1 is compared to the input 206 of first auto-encoder 204-1 to determine an error value associated with the sensor data being received by auto-encoder 204-1. If the error value is below a given threshold, then the sensor data received by auto-encoder 204-1 is determined to be valid (e.g., no anomaly). However, if the error value is above the given threshold, then the pattern between the sensor data received by auto-encoder 204-1 is not matching the expected data pattern (learned via training). In this case, warning indicator module 212 generates a warning signal or signals associated with the group of sensor data received by auto-encoder 204-1. This process is repeated separately for each of auto-encoders 204-1-204-n to determine if any of the sensor data groups include an anomaly. The warning signal may have characteristics regarding the detected anomaly such as a time period over which the warning is issued and an average severity of the warning. The severity may be proportional to the magnitude of the error value (difference between the auto-encoder input and output).

It is possible that not all detected anomalies from warning indicator module 212 are caused by a cyberattack or a malfunctioning sensor. Sometimes, sensor output can exhibit momentary glitches that may be classified as an anomalous event by warning indicator module 212. According to an embodiment, a selection module 214 is used to monitor the characteristics of the warning signals generated from warning indicator module 212 and to remove or otherwise suppress those warning signals that do not meet certain criteria. The removed or suppressed warning signals may be determined to be warnings that were issued due to signal noise or for minor sensor abnormalities not caused by cyberattacks or sensor malfunction.

The criteria used by selection module 214 may be different based on the application, the type of vehicle that the CAN is present in, or the number or complexity of the auto-encoders in the system, to name a few examples. In some embodiments, selection module 214 compares characteristics of the received warning signal(s) from warning indicator module 212 against one or more threshold values to determine if certain criteria are met. In some examples, all of the criteria must be met for a given warning signal in order to verify that the given warning signal is legitimate.

In one example, selection module 214 compares a time period over which the warning signal is issued to a threshold value. If the time period of the warning signal is determined to be greater than the threshold, then the time criteria of selection module 214 is met, according to an embodiment. Ensuring that the warning signal is issued over a certain time period may remove (suppress) erroneous warning signals caused by momentary sensor glitches or noise spikes.

In another example, selection module 214 compares an average severity (severity averaged over the time period of the warning signal) to a threshold value. The warning signal severity may be equal to or proportional to the error difference between the output and the input of the auto-encoder associated with the warning signal. If the average severity of the warning signal is determined to be greater than the threshold, then the severity criteria of selection module 214 is met, according to an embodiment. Warning signals that do not have a high enough average severity may be caused by sensor drift, background noise, or some other relatively benign cause.

It should be understood that other criteria beyond the two examples provided above could also be used by selection module 214. For example, other criteria may include requiring that the warning signal includes a max severity value higher than a certain threshold. Furthermore, a warning signal may be determined to be legitimate (e.g., caused by a cyberattack or a sensor malfunction) if it meets all of the signal criteria of selection module 214. The criteria in one example is configurable by the end-user so that application specific items or limits are used in the processing. In some embodiments, the warning signal is considered legitimate if it meets a certain percentage of the signal criteria of selection module 214. In still other embodiments, some criteria may be more heavily weighted than others and the warning signal is considered legitimate if it meets enough of the weighted criteria.

As noted above, a generated warning signal may be issued for a sensor data group that includes at least three different sensors. This means that it may not be possible to determine specifically which of the at least three different sensors in the sensor data group was attacked or malfunctioning. However, in some embodiments, observing the outputs of the other auto-encoders can provide information on which specific sensors are providing anomalous signals. Recall that some of the sensor outputs may be fed to more than one auto-encoder. Thus, in one example, if a first auto-encoder that receives a sensor output provides anomalous output and a second auto-encoder that receives the sensor output does not provide anomalous output, then it is likely that the sensor associated with the sensor output is not the cause of the anomalous output from the first auto-encoder. Similarly, in another example, if three different auto-encoders receive the same sensor output as the only signal that is common to the three different auto-encoders and each of the three different auto-encoders provides anomalous output, then it is likely that the sensor associated with the sensor output is under attack or is malfunctioning.

In some embodiments, selection module 214 further includes a fusion module 216 that aggregates data from multiple sources such as other auto-encoders or other types of anomaly detecting devices to ensure that any warning signals issued by warning indicator module 212 are legitimate (rather than false positives, or spoofs, for instance). For example, fusion module 216 can operate in several layers by checking the legitimacy of warnings coming from different auto-encoders against each other. The various warnings can be grouped by signals and signal types, separately by the CAN node (e.g., sensor or group of sensors) whose packets or signals were flagged by warning indicator module 212, and finally, the warnings can be grouped by which auto-encoder they came from. In some such embodiments, fusion module 216 is programmed or otherwise configured to form internal alerts from the warning groups and uses Subject Matter Expert knowledge that is algorithmized into mathematical actions that assign a confidence rating or weight or other qualifier to each internal alert, wherein the rating, weight, or qualifier is indicative of the likelihood that the internal alert is legitimate (or not, as the case may be). Further filtering and grouping of the internal alerts may cause issuance and cancellation of the warning signal(s). Any number of vetting schemes can be used to assess the legitimacy of a given warning signal, as will be appreciated in light of this disclosure. According to some embodiments, fusion module 216 further allows anomaly detection system 108 to be sensitive to various disturbances in the sensor signals or signal packets, in their timing, and in the values of the signals transmitted inside packets. In some embodiments, fusion module 216 may provide feedback to one or both of warning indicator module 212 and selection module 214 to suppress the generation of specific warning signals that are determined to not be valid over some predetermined time period. Warning indicator module 212 and selection module 214 may reset themselves (e.g., wiping any signal suppression) after an indicated or fixed period of time, or may reset themselves via a reset signal provided by fusion module 216.

According to some embodiments, the generated warning signal(s) are delivered to a human operator or user via some output means, such as graphics or text on a display, a light, an audible sound, a vibration, or any combination thereof. In some embodiments, any of the sensors associated with the anomalous sensor data group can have their operation ceased or reset. In some embodiments, the CAN environment may be designed to switch over to using other sensors (e.g., redundant sensors) or backup sensors in response to the generated warning signal(s). The generated warning signal(s) may be stored for future recovery along with other corresponding data, such as a timestamp of the anomalous detection event, waveforms of the received anomalous sensor data, etc.

Auto-Encoder Design

Figure 3:
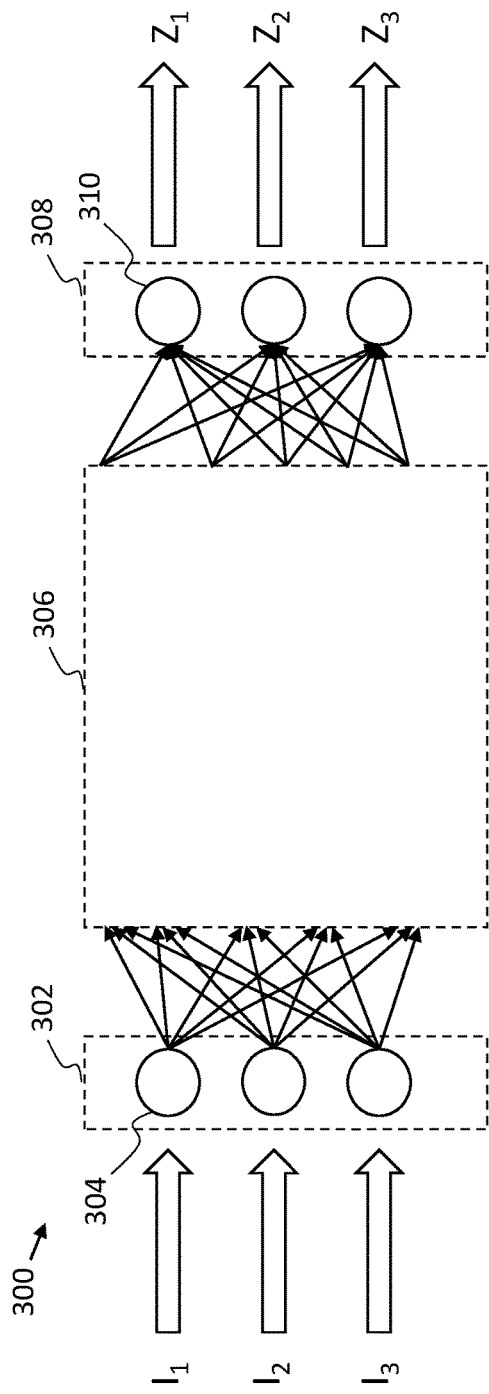
FIG. 3 illustrates a schematic diagram of an auto-encoder that can be used in the anomaly detection system of FIG. 2, in accordance with an embodiment of the present disclosure.

FIG. 3 illustrates an example schematic of an auto-encoder 300, according to an embodiment. As will be appreciated, auto-coder 300 can be used to implement encoders 204 of the anomaly detection system of FIG. 2. In this example, auto-encoder 300 receives input from three different sensors $I_1$, $I_2$, and $I_3$, and generates three output signals $Z_1$, $Z_2$, and $Z_3$. Auto-encoder 300 is a type of neural network that solves a series of equations at each layer of the network in order to accurately recreate the input data $I_1$, $I_2$, and $I_3$ as the output data $Z_1$, $Z_2$, and $Z_3$. The breaking down of the input data and subsequent recreation of the data as output data is performed within a number of hidden layers within a hidden block 306. This encoding-decoding operation of hidden layers 306 gives rise to the name of this type of neural network—an auto-encoder.

Input data $I_1$, $I_2$, and $I_3$ is receives at an input layer 302 with each of the signals being receives by an input neuron 304. Afterwards, the data of each input neuron 304 is fed into each of the neurons of the first hidden layer of hidden block 306. Data is then subsequently fed to additional hidden layers in this fashion until the data is ultimately fed to the three output neurons 310 of output layer 308.

The various hidden layers of hidden block 306 solves for parameters in equations related to the input data in order to determine relationship(s) between the input data. In some embodiments, patterns between the input data over a given time period are recognized and remembered by auto-encoder 300. These patterns are determined by finding the variables for the various equations that most closely cause the input data $I_1$, $I_2$, and $I_3$ to be reconstructed as output data $Z_1$, $Z_2$, and $Z_3$. Once these variables are established, the pattern is now "known" by auto-encoder 300 and any future deviation from this pattern when receiving the same inputs could be a sign that one or more of the sensors producing output data $I_1$, $I_2$, and $I_3$ is under attack or is malfunctioning. Establishing the data patterns for a given set of sensor inputs is performed during a training stage that is described in more detail with reference to FIG. 6.

The number of hidden layers and their complexity (e.g., number of neurons) within hidden block 306 can vary depending on the application and environment. The more hidden layers used (and the higher their complexity), the more accurate the reconstruction and the more robust the pattern recognition is due to the higher complexity of data patterns and greater number of data points in the data set. However, more hidden layers and/or more complexity also requires a longer training time and higher computational power. Accordingly, there is a trade-off when designing the neural net structure of hidden block 306 to provide enough complexity to recognize patterns and deviations from those patterns of the input signals, but not so much complexity that the computational resources required to train and/or operate the auto-encoder become too expensive or impractical to include in a given situation. In one example, the number of hidden layers is odd and the central layer has a number of neurons that is smaller than the number of inputs such that the number of outputs is equal to the number of inputs. For an example having three inputs, the width of the central layer would be two neurons. As an example having five hidden layers for a symmetrical auto-encoder, the number of neurons in layer five is equal to the number of neurons in hidden layer one (N1) and the number of neurons in hidden layer four is equal to the number of layers in hidden layer two N(2), with N1>N2.

Figure 4:
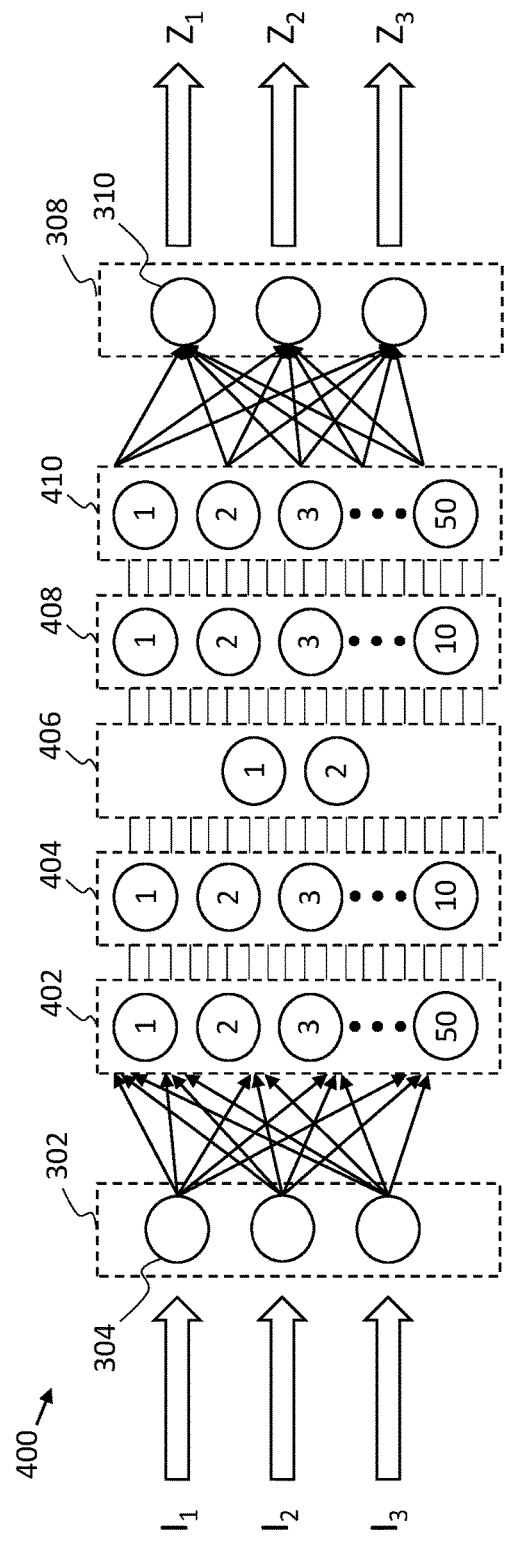
FIG. 4 illustrates a schematic diagram of a symmetrical auto-encoder that can be used in the anomaly detection system of FIG. 2, in accordance with another embodiment of the present disclosure.

FIG. 4 illustrates one example of an auto-encoder 400 that includes the same input/output layers 302/308 as discussed above in FIG. 3, but also includes five hidden layers with a specific number of neurons in each hidden layer, according to an embodiment. In some embodiments, and as will be appreciated, auto-encoder 400 represents the design of any one or more of auto-encoders 204 in anomaly detection system 108. Specifically, in this embodiment, a first hidden layer 402 includes 50 neurons, a second hidden layer 404 includes 10 neurons, a third hidden layer 406 includes 2 neurons, a fourth hidden layer 408 includes 10 neurons, and a fifth hidden layer 410 includes 50 neurons. Note the symmetrical nature of the number of hidden layers and the number of neurons within each of the hidden layers. This symmetrical design is due to the function of the auto-encoder to both encode and decode the input to arrive at an output that closely matches the input. Accordingly, hidden layers 402 and 404 may be considered the "encoder" portion of auto-encoder 400 while hidden layers 408 and 410 are the "decoder" portion of auto-encoder 400. The middle hidden layer 406 may represent the most detailed equations that characterize the pattern(s) between input data $I_1$, $I_2$, and $I_3$, although in some examples hidden layer 406 is part of either or both the encoder portion and the decoder portion.

Briefly, each neuron of hidden layer 402 receives input data $I_1$, $I_2$, and $I_3$ and generates an output that is equal to $I_1x+I_2y+I_3z+k$, with x, y, z, and k being parameters that are different across the 50 neurons of hidden layer 402. Ultimately, 50 outputs are provided by hidden layer 402 to hidden layer 404 where the process is repeated now having 10 equations with 51 parameters to solve for in each equation to provide 10 outputs from hidden layer 404 to hidden layer 406. The decoding portion of auto-encoder 400 works in a similar fashion as discussed above for the encoding portion.

In one example of operation, auto-encoder 400 is trained over a period of time using clean output data from three sensors in a CAN environment. The training produces the set of variables to solve the various equations that cause the output signals $Z_1$, $Z_2$, and $Z_3$ to equal the input signals $I_1$, $I_2$, and $I_3$ from the three vehicle sensors. The determined variables may represent the learned pattern between the sensor output data. Once the training is complete, auto-encoder 400 may be used within a CAN environment and receive output from three sensors within the environment. In some embodiments, auto-encoder 400 is used with the same three sensors that were used to produce the training data for auto-encoder 400. In some other embodiments, auto-encoder 400 is used with other sensors that are the same type as the sensors used to produce the training data. As auto-encoder 400 receives the sensor data, the output signals $Z_1$, $Z_2$, and $Z_3$ are continuously, periodically, or semi-periodically, being compared to the input signals $I_1$, $I_2$, and $I_3$ with the difference (e.g., error) being used to determine if an anomaly is present. If the error crosses higher than a threshold, then a warning signal may be generated. The error occurs because the expected pattern between the sensor outputs changes, and the change may be caused by a cyberattack to one or more of the three sensors having their output received by auto-encoder 400.

The example process described above may occur simultaneously across multiple auto-encoders having the same design as auto-encoder 400. In some embodiments, each of the multiple auto-encoders receives a unique set of three output signals from three sensors in the CAN environment. In some embodiments, some of the multiple auto-encoders may receive the same set of three output signals to act as redundant devices for monitoring the signals for any anomalies. As noted above, the auto-encoders may be designed to receive more than three sensor outputs to produce more intricate pattern recognition among more sensors, but this increases the computational complexity involved.

Figure 5:
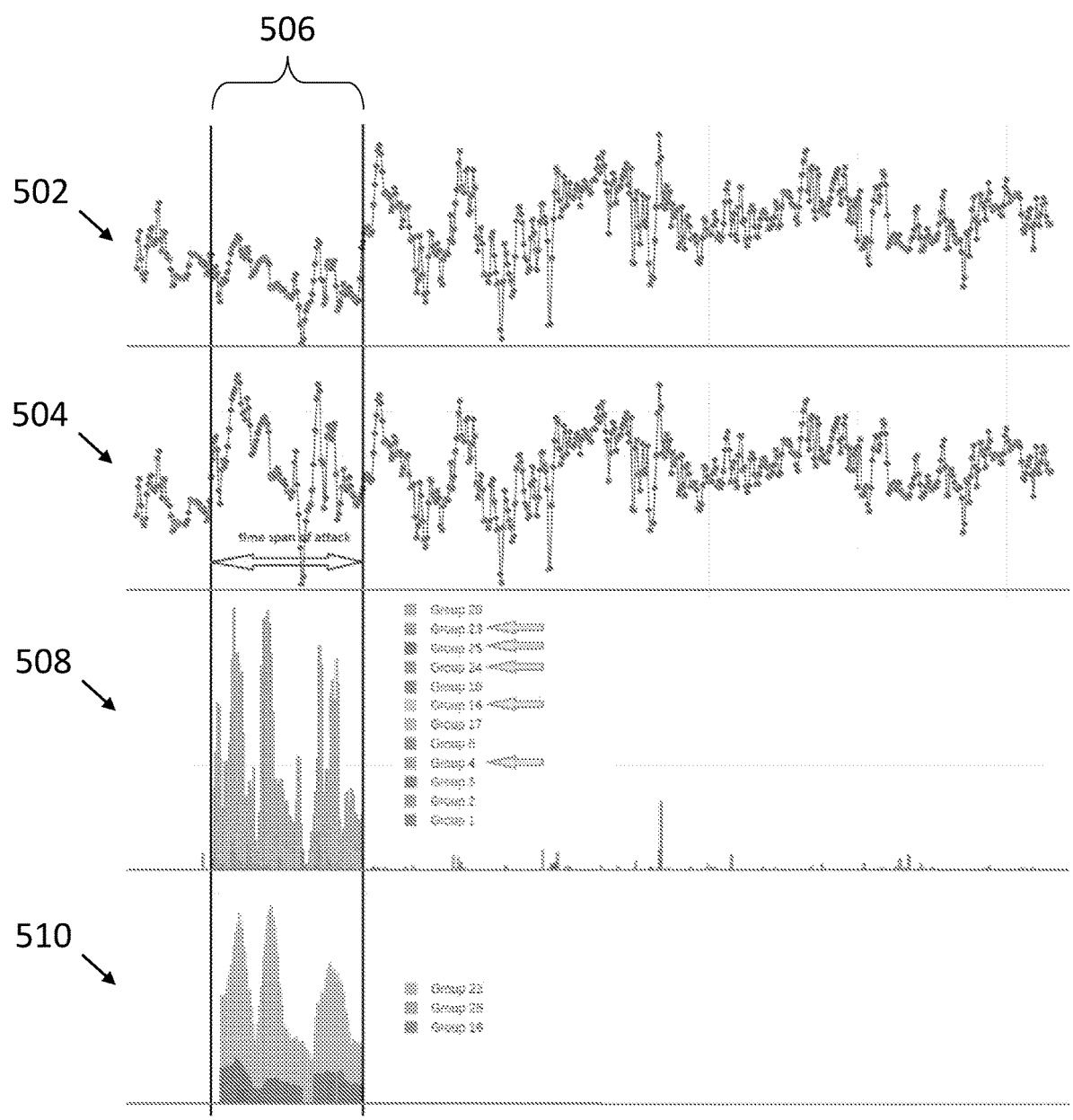
FIG. 5 provides data of a cyberattack on a CAN environment configured with an anomaly detection system, and the resulting output from the anomaly detection system, in accordance with an embodiment of the present disclosure.

FIG. 5 illustrates example signal outputs from various stages of anomaly detection system 108, according to some embodiments. Plot 502 represents signal output from a sensor that is operating normally. The sensor may be a sensor on a vehicle CAN, such as a speed sensor, pressure sensor, altitude sensor, etc. Plot 502 shows magnitude of the sensor output along the y-axis over time along the x-axis. As can be seen, the sensor output demonstrates a noticeable waveform pattern over time.

Plot 504 represents the simulated signal output from the sensor that is under attack during an attack window 506. The cyberattack causes the sensor output to change fairly significantly during attack widow 506, but not much at all outside of attack window 506. However, this change to the sensor output during attack window 506 may be low enough to evade a typical range sensor and also have a similar enough pattern variation to evade a heuristic sensor. For these reasons, an auto-encoder based approach is a better way to detect the cyberattack. As can be seen in plot 504, the sensor output shows greater magnitude spikes in the attack window 506, but the same relative variation.

Plot 508 represents the warning signal(s) issued by a plurality of auto-encoders of anomaly detection system 108. The height of each bar represents the severity of the warning signal at a particular moment in time. Each of the listed Groups represents a single auto-encoder. In this example, 12 auto-encoders produced at least one warning signal due to the changed sensor output. The arrows indicate the five auto-encoders (labeled Groups 4, 16, 23, 24, and 25) that each actually received the sensor output as one of its inputs. The other auto-encoders in the list also produced warning signals, though these warning signals were not a direct result of the simulated attack on the sensor signal. As can be seen, the majority of warning signals (and the most severe warning signals) are issued during attack window 506, as to be expected. However, other warning signals are also issued outside of attack window 506. Additionally, some warning signals issued within attack window 506 have a relatively low severity. In one embodiment, plot 508 represents the warnings issued by warning indicator module 212.

Plot 510 represents the warning signal(s) remaining after undergoing a selection and removal process, such as one performed by selection module 214, according to an embodiment. As can be seen, the warning signals that existed outside of attack window 506 have all been removed. These warning signals may have been removed because they did not meet all or an expected portion of the criteria of selection module 214. Additionally, some of the warning signals from within attack window 506 were removed for not meeting all or an expected portion of the criteria of selection module 214. In this example, after filtering out the false warning signals, only three auto-encoders (groups 16, 23, and 25) were deemed to be generating output that was sufficiently anomalous to be considered a cyberattack. Accordingly, the sensors associated with these auto-encoders (which would include the sensor that generated the sensor output in this example) could be suspected of being victimized by a cyberattack. In one embodiment, since the sensor output in this example may be the only common input signal across auto-encoder groups 16, 23, and 25, the system may be able to determine that the sensor generating this sensor output is the single sensor that is under attack. Note in this example that even though the sensor output was also received by auto-encoder groups 4 and 24, output of these auto-encoders did not meet the criteria and thus their warnings were removed. This highlights one example of why it can beneficial to have each sensor output be received by multiple auto-encoders to produce pattern recognition with various other sensor signals.

Neural Network Training Methodology

Figure 6:
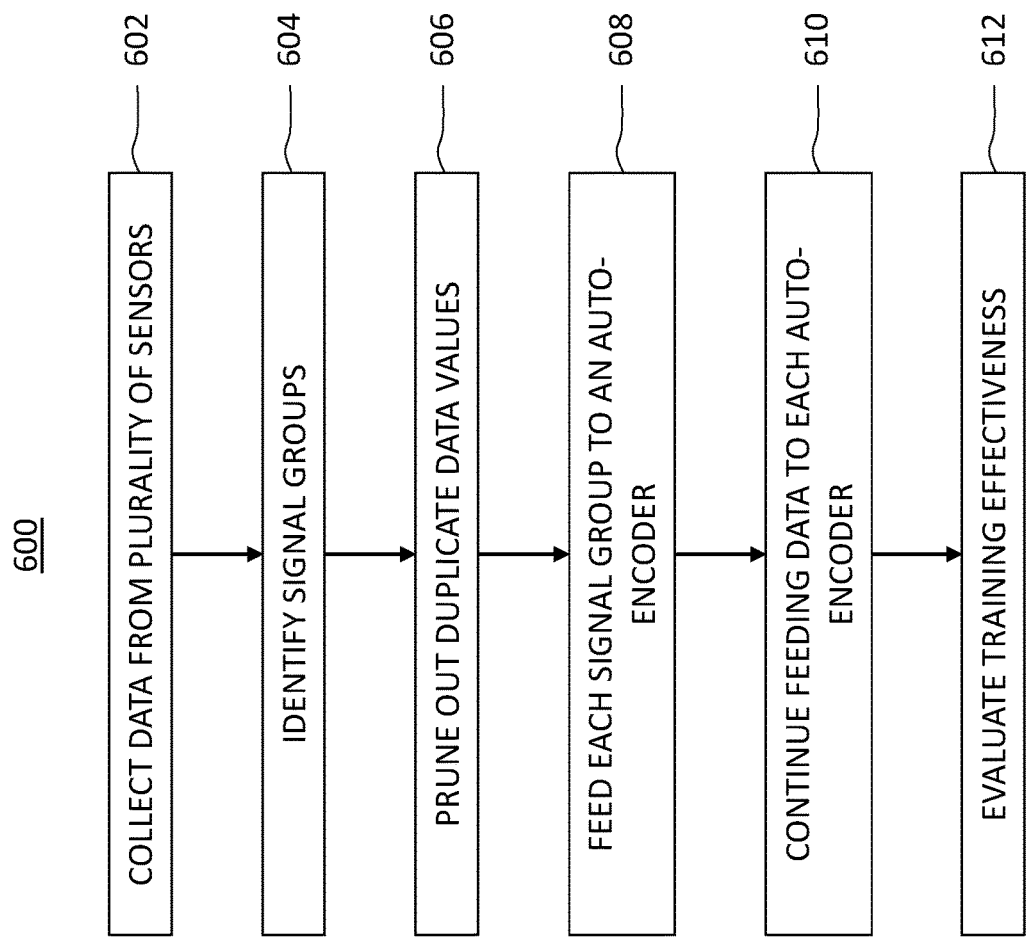
FIG. 6 is a method of training an auto-encoder to detect signal anomalies, in accordance with some embodiments of the present disclosure.

FIG. 6 is a flow diagram of an example method 600 for training an anomaly detection system, such as anomaly detection system 108, according to an embodiment of the present disclosure. Method 600 may be performed, for example, using one or more of the illustrated components of CAN 100. More generally, method 600 and other methods described herein may be implemented in hardware or combinations of hardware and software. In another embodiment, method 600 may be implemented by a custom circuit such as a neural network training circuit with custom processing circuits configured to carry out method 600. In other embodiments, method 600 may be performed in conjunction with a special purpose processor, such as a signal processor. In addition, while the methods described herein may appear to have a certain order to their operations, other embodiments may not be so limited. Accordingly, the order of the operations can be varied between embodiments, as would be apparent in light of this disclosure.

Method 600 begins at block 602 where data is collected from a plurality of sensors in a CAN environment, according to an embodiment. The sensors may be found on a vehicle and measure any one or more of environmental conditions, performance of vehicle systems, status of surrounding objects, and status of human operators to name a few examples. In some embodiments, the data is collected from sensors across more than one vehicle or even across different vehicle types. The data may be collected from the sensors over a period of time, such as over several days. In some embodiments, sensors may produce output signals at different rates. To provide a common ground for signals that are sent at different rates, each observed signal may be averaged over a particular time window (e.g., over a one second window). According to an embodiment, each sensor may produce over one million data points over the total data collection time.

Method 600 proceeds with block 604 where a plurality of signal groups are identified from amongst the monitored sensors, according to an embodiment. Manual signal analysis may be used to identify groups of signals that show potentially learnable patterns in their relationships. In some embodiments, each identified group of signals contains three or more signals, or exactly three signals. By considering three signals at a time in each group, a 3-D space can be realized where the axes are normalized signal values, and each data point in the 3-D space represents the values of the three signals collected over a single time window (e.g., one second window), as described above. According to some embodiments, only the total aggregate superposition of all measurement values at each time window are considered, not the evolution of signals as a time series. In one particular example, among 81 physical sensor signals observed across one or more CAN environments, a total of 29 sensor groups having three signals each may be found that show reasonably strong relationships. Some signals may belong to many sensor groups, while other signals may not belong to any sensor groups (e.g., did not exhibit a strong pattern relationship with any other signals).

Method 600 proceeds with block 606 where duplicate data values within each sensor group are pruned out, according to an embodiment. In some embodiments, the nature of the physical signals collected is such that sometimes the signals do not change significantly for many minutes (and sometimes hours). One common example for a signal group of three signals is to receive signal output of (0, 0, 0) over an extended time. If all of these repetitive data points remain in the data set, the neural network can over-train over the repetitive data points, and risk not capturing the remaining variety of patterns present in the relationships between signals. Pruning these duplicate values can significantly reduce the size of the training data set for each signal group. For example, pruning one signal data group that started with around one million data points left it with only 153,780 data points. Other groups may be impacted differently from the pruning. For example, some groups may lose much less than 50% of the original data points in the pruning process.

Method 600 proceeds with block 608 where each of the signal groups is fed into a respective auto-encoder, according to an embodiment. Each of the auto-encoders may have the same neural net design, such as auto-encoder 300 or 400 designed to receive a signal group of three signals. Each auto-encoder may be trained separately on its own set of signals. Following a first round of training, each auto-encoder attempts to recreate the input as output. Multiple rounds of training are performed at each auto-encoder by continually feeding the data at block 610, with the error difference from the previous round being used to adjust weighting and/or bias values correspondingly in an attempt to yield lower error during the next training round. Each training round is sometimes known as an epoch. As will be further appreciated, each epoch may include one or more iterations to complete that epoch, wherein each iteration corresponds to a batch of training data (or signal group). Over the course of many (e.g., hundreds, thousands or tens of thousands, or higher) epochs, the output signals of each auto-encoder become closer and closer to converging on the respective input signals. Any number of epochs (as well as any number of iterations within an epoch) can be used to train the auto-encoders, with higher numbers of epochs yielding better pattern recognition at the cost of longer training times. Further note that absolute convergence is not required; rather convergence within a threshold acceptable to the application at hand is fine, as will be appreciated. Once that threshold is met, the method 600 may continue to block 612.

Method 600 proceeds with block 612 where the training effectiveness of one or more of the auto-encoders is evaluated, according to an embodiment. In one example, training effectiveness is determined by taking an auto-encoder that is trained using the sensors of one vehicle and feeding that auto-encoder data from the same sensors but on a different vehicle. In some such example embodiments, both of the vehicles are the same make and model while in other embodiments the vehicles have a different make and/or model. If the auto-encoder output still shows a strong match with the input with the new sensors, then the training of the auto-encoder may be deemed to be effective. In another example case, the performance of the auto-encoder as an anomaly detector may be tested by feeding the auto-encoder sensor output signals that are each shifted by a certain amount (e.g., each shifted by ½ of the signal's standard deviation). The performance may be tested for each signal received by the auto-encoder, such that an auto-encoder receiving a group of three signals may be tested to see if it detects an anomaly if the first signal is shifted, if the second signal is shifted, or if the third signal is shifted. In some embodiments, an auto-encoder may be more sensitive to changes in some of its received signals vs. others.

Detection Methodology

Figure 7:
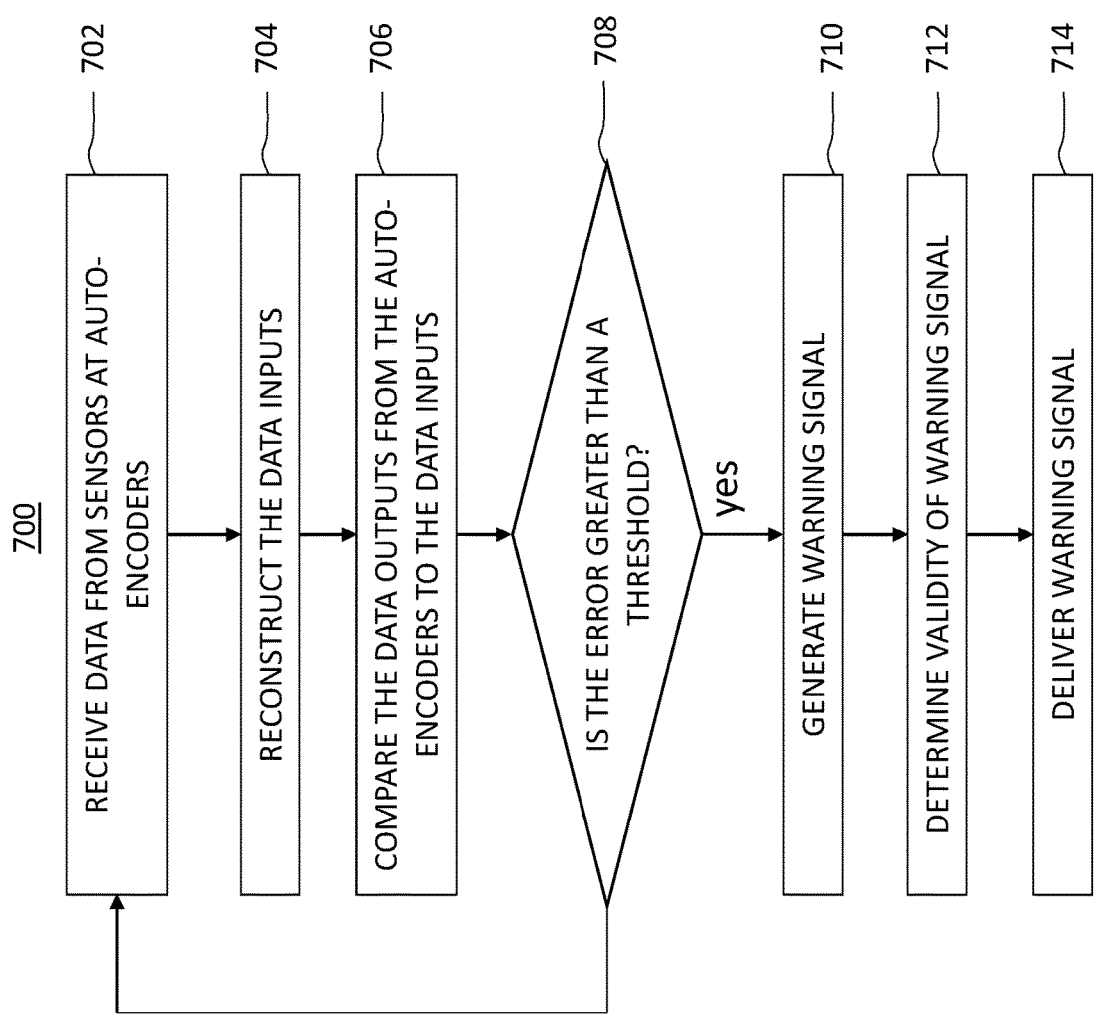
FIG. 7 is a method of detecting one or more signal anomalies among a plurality of sensors, in accordance with some embodiments of the present disclosure.

FIG. 7 is a flow diagram of an example method 700 for detecting a cyberattack in an CAN environment, according to an example embodiment. The operations of method 700 may be carried out by anomaly detection system 108, according to an embodiment of the present disclosure, as will be appreciated. More generally, method 700 and other methods described herein may be implemented in hardware or combinations of hardware and software. In one such embodiment, method 700 may be implemented by a custom circuit (purpose-built semiconductor) such as an anomaly detection circuit with custom processing circuits configured to carry out method 700. In other embodiments, method 700 may be performed by one or more processors programmed or otherwise configured to carry out anomaly detection as provided herein. In addition, while the methods described herein may appear to have a certain order to their operations, other embodiments may not be so limited, as will be appreciated. Accordingly, the order of the operations can be varied between embodiments, as will be apparent in light of this disclosure.

Method 700 begins at block 702 where data is received from the sensors of the CAN environment at a plurality of auto-encoders, according to an embodiment. The sensors may be found on a vehicle and measure any one or more of environmental conditions, performance of vehicle systems, status of surrounding objects, and status of human operators to name a few examples. The sensor output from each sensor may be routed to an input of one or more of the auto-encoders, such that each auto-encoder receives a sensor data group. Some of the sensor outputs may only be fed to a single auto-encoder while other sensor outputs are fed to more than one auto-encoder.

Method 700 continues with block 704 where each auto-encoder attempts to reconstruct the input sensor data as output data, according to an embodiment. The reconstruction takes place using a neural network of hidden layers as described above with reference to FIGS. 3 and 4.

Method 700 continues with block 706 where the output data from each auto-encoder is compared to its respective input data, according to an embodiment. The difference between each output signal and its respective input signal may represent an error value associated with the given auto-encoder. In some embodiments, error values are determined separately for each of the signals output from a given auto-encoder. In other embodiments, a single error value for an auto-encoder is determined by averaging the error values of each of its outputs.

Method 700 continues with decision block 708 where the error value(s) associated with a given auto-encoder are compared against a threshold. If the error is above the threshold, then method 700 continues to block 710 where a warning signal is generated. The warning signal may have characteristics regarding the detected anomaly such as a time period over which the warning is issued and an average severity of the warning. The severity may be proportional to the magnitude of the error value (difference between the auto-encoder input and output). Regardless of how the error value compares against the threshold, method 700 will also continue back with block 702 to receive the next set of data from the sensors and repeat the reconstruction process at the auto-encoders.

As noted above, not all warning signals are a cause for concern. Method 700 continues with block 712 where the validity of the warning signal is determined by comparing the warning signal to certain criteria, according to an embodiment. The criteria used may be different based on the application, the type of vehicle that the CAN is present in, or the number or complexity of the auto-encoders in the system, to name a few examples. In some embodiments, characteristics of the received warning signal(s) are compared against one or more threshold values to determine if certain criteria are met. Examples of criteria thresholds include a certain duration over which the warning is issued, an average severity level of the warning, or a peak severity of the warning. In some examples, all of the criteria must be met for a given warning signal in order to verify that the given warning signal is legitimate. In some embodiments, the warning signal is considered legitimate if it meets a certain percentage of the signal criteria. In still other embodiments, some criteria may be more heavily weighted than others and the warning signal is considered legitimate if it meets enough of the weighted criteria.

Method 700 continues with block 714 where the validated warning signal is delivered either to a human operator or to a system that takes action based on the issued warning, according to an embodiment. For example, the warning signal(s) can be delivered to a human operator or user via some output means, such as graphics or text on a display, a light, an audible sound, a vibration, or any combination thereof. In some embodiments, any of the sensors associated with the anomalous sensor data group can have their operation ceased or reset. In some embodiments, the CAN environment may be designed to switch over to using other sensors (e.g., redundant sensors) or backup sensors in response to the warning signal(s). The generated warning signal(s) may be stored for future recovery along with other corresponding data, such as a timestamp of the anomalous detection event, waveforms of the received anomalous sensor data, etc.

Example Computing Device

Figure 8:
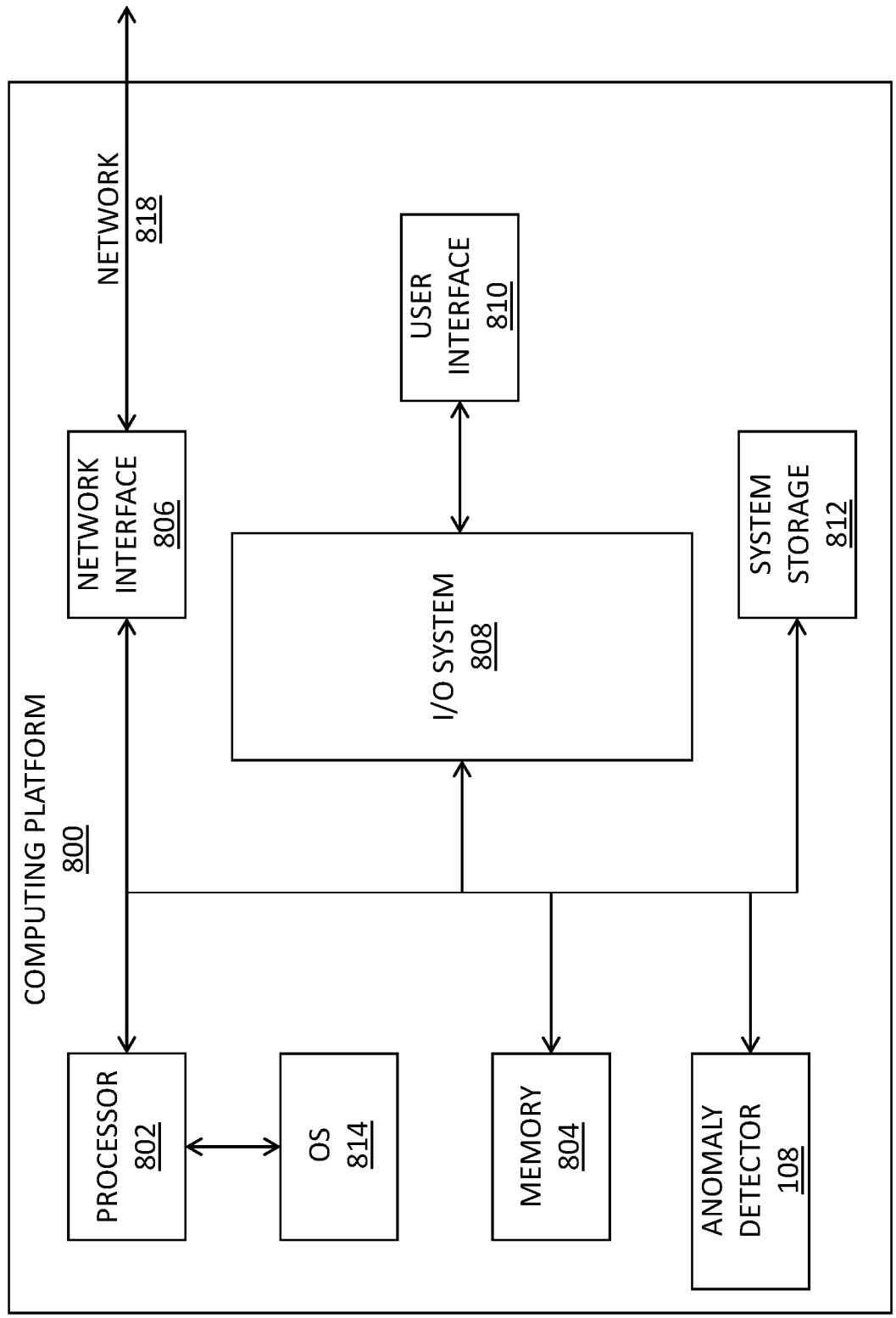
FIG. 8 illustrates a block diagram of an example computing platform having an anomaly detection system, in accordance with some embodiments of the present disclosure.

FIG. 8 illustrates an example computing platform 800 that interfaces with an anomaly detection system 108, configured in accordance with certain embodiments of the present disclosure. In some embodiments, computing platform 800 may host, or otherwise be incorporated into a personal computer, workstation, server system, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), messaging device, data communication device, imaging device, wearable device, embedded system, and so forth. Any combination of different devices may be used in certain embodiments. Computing platform 800 may host a controlled area network (CAN) used on board a vehicle. In some embodiments, computing platform 800 represents one system in a network of systems coupled together via a CAN bus.

In some embodiments, computing platform 800 may comprise any combination of a processor 802, a memory 804, anomaly detection system 108, a network interface 806, an input/output (I/O) system 808, a user interface 810, and a storage system 812. In some embodiments, anomaly detection system 108 is implemented as part of processor 802. As can be further seen, a bus and/or interconnect is also provided to allow for communication between the various components listed above and/or other components not shown. Computing platform 800 can be coupled to a network 818 through network interface 806 to allow for communications with other computing devices, platforms, or resources. Other componentry and functionality not reflected in the block diagram of FIG. 8 will be apparent in light of this disclosure, and it will be appreciated that other embodiments are not limited to any particular hardware configuration.

Processor 802 can be any suitable processor and may include one or more coprocessors or controllers to assist in control and processing operations associated with computing platform 800. In some embodiments, processor 802 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core.

Memory 804 can be implemented using any suitable type of digital storage including, for example, flash memory and/or random access memory (RAM). In some embodiments, memory 804 may include various layers of memory hierarchy and/or memory caches as are known to those of skill in the art. Memory 804 may be implemented as a volatile memory device such as, but not limited to, a RAM, dynamic RAM (DRAM), or static RAM (SRAM) device. Storage system 812 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage system 812 may comprise technology to increase the storage performance enhanced protection for valuable digital media when multiple hard drives are included.

Processor 802 may be configured to execute an Operating System (OS) 814 which may comprise any suitable operating system, such as Google Android (Google Inc., Mountain View, CA), Microsoft Windows (Microsoft Corp., Redmond, WA), Apple OS X (Apple Inc., Cupertino, CA), Linux, or a real-time operating system (RTOS). As will be appreciated in light of this disclosure, the techniques provided herein can be implemented without regard to the particular operating system provided in conjunction with computing platform 800, and therefore may also be implemented using any suitable existing or subsequently-developed platform.

Network interface 806 can be any appropriate network chip or chipset which allows for wired and/or wireless connection between other components of computing platform 800 and/or network 818, thereby enabling computing platform 800 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 808 may be configured to interface between various I/O devices and other components of computing platform 800. I/O devices may include, but not be limited to, a user interface 810. User interface 810 may include devices (not shown) such as a display element, touchpad, keyboard, mouse, and speaker, etc. I/O system 808 may include a graphics subsystem configured to perform processing of images for rendering on a display element. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 802 or any chipset of computing platform 800.

It will be appreciated that in some embodiments, the various components of the computing platform 800 may be combined or integrated in a system-on-a-chip (SoC) architecture. In some embodiments, the components may be hardware components, firmware components, software components or any suitable combination of hardware, firmware or software.

In various embodiments, computing platform 800 may be implemented as a wireless system, a wired system, or a combination of both. When implemented as a wireless system, computing platform 800 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, computing platform 800 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Some of the embodiments discussed herein may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, is a functional apparatus and may comprise, for example, singly or in any combination, hardwired circuitry, programmable circuitry such as one or more computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software stored in a machine-readable medium and that can be executed by a programmable control device. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Thus, a circuit or circuitry is a functional physical apparatus that can be any of integrated circuitry, printed circuit board circuitry, gate-level logic, analog and/or digital circuitry, one or more programmed processors or processing entities (e.g., combination of instructions and one or more processors configured to execute those instructions).

Further Example Embodiments

The following examples pertain to further embodiments, from which numerous permutations and configurations will be apparent.

Example 1 is a controller area network that includes a plurality of sensors, a data bus coupled to the plurality of sensors, and a processing device coupled to the data bus. The plurality of sensors are configured to output sensor data and the data bus is configured to receive sensor data from the sensors. The processing device includes an anomaly detection module and a warning indicator module. The anomaly detection module comprises one or more auto-encoders. Each auto-encoder is configured to receive sensor data from at least three of the sensors via the data bus. The warning indicator module is configured to compare an output of a given auto-encoder of the one or more auto-encoders to an input of the given auto-encoder to obtain an error value, and to compare that error value against an error threshold and, in response to the error value indicating that the error threshold has been exceeded, to issue a warning signal associated with the sensor data received by the given auto-encoder.

Example 2 includes the subject matter of Example 1, wherein the processing device further comprises a selection module configured to compare the warning signal issued by the warning indicator module to a set of criteria, and to suppress the warning signal if it does not meet one or more criteria in the set of criteria.

Example 3 includes the subject matter of Example 2, wherein the warning signal issued by the warning indicator module has characteristics that include a time period over which the warning is issued and an average severity with respect to a threat represented in the sensor data associated with the warning signal.

Example 4 includes the subject matter of Example 3, wherein the set of criteria comprises one or both of a threshold time period and a threshold average severity.

Example 5 includes the subject matter of any one of Examples 2-4, wherein the selection module comprises a fusion module configured to check a legitimacy of warning signals coming from different auto-encoders against each other, and to cancel warning signals that are determined to be not legitimate.

Example 6 includes the subject matter of any one of Examples 1-5, wherein the one or more auto-encoders comprise one or more symmetrical auto-encoders.

Example 7 includes the subject matter of any one of Examples 1-6, wherein each of the one or more auto-encoders includes five hidden layers.

Example 8 includes the subject matter of Example 7, wherein a first hidden layer of the five hidden layers includes 50 neurons, a second hidden layer includes 10 neurons, a third hidden layer includes 2 neurons, a fourth hidden layer includes 10 neurons, and a fifth hidden layer includes 50 neurons.

Example 9 includes the subject matter of any one of Examples 1-8, wherein the plurality of sensors are coupled to a vehicle.

Example 10 is a vehicle comprising the controller area network of any one of examples 1-9.

Example 11 is an anomaly detection system that includes an anomaly detection circuit and a warning indicator circuit. The anomaly detection circuit comprises a plurality of auto-encoders. The plurality of auto-encoders receive sensor data from a plurality of sensors such that each auto-encoder of the plurality of auto-encoders receives sensor data from at least three different sensors of the plurality of sensors. The warning indicator circuit compares an output of a given auto-encoder of the plurality of auto-encoders to an input of the given auto-encoder to obtain an error value, and compares that error value against an error threshold. In response to the error value indicating that the error threshold has been exceeded, the warning indicator circuit issues a warning signal associated with the sensor data received by the given auto-encoder.

Example 12 includes the subject matter of Example 11, further comprising a selection circuit configured to compare the warning signal issued by the warning indicator circuit to a set of criteria, and to remove the warning signal if it does not meet one or more criteria in the set of criteria.

Example 13 includes the subject matter of Example 12, wherein the warning signal issued by the warning indicator circuit has characteristics that include a time period over which the warning is issued and an average severity.

Example 14 includes the subject matter of Example 13, wherein the set of criteria comprises one or both of a threshold time period and a threshold average severity.

Example 15 includes the subject matter of any one of Examples 11-14, wherein the plurality of auto-encoders comprise symmetrical auto-encoders.

Example 16 includes the subject matter of any one of Examples 11-15, wherein each of the plurality of auto-encoders includes five hidden layers.

Example 17 includes the subject matter of Example 16, for a system having a number of inputs (I) and outputs (O), wherein a first hidden layer of the five hidden layers has N1 neurons, a second hidden layer has N2 neurons, the fourth hidden layer has N2 neurons and the fifth hidden layer has N1 neurons. The central layer, which is the layer number three in the case of five layers has N3 neurons where N3<I.

A further Example includes the subject matter of Example 17, wherein a first hidden layer of the five hidden layers includes 50 neurons, a second hidden layer includes 10 neurons, a third hidden layer includes 2 neurons, a fourth hidden layer includes 10 neurons, and a fifth hidden layer includes 50 neurons.

Example 18 includes the subject matter of any one of Examples 11-17, further comprising the at least three different sensors, wherein the at least three different sensors are coupled to a vehicle.

Example 19 is a vehicle comprising the anomaly detection system of any one of Examples 11-18.

Example 20 is a method of detecting one or more signal anomalies among a plurality of sensors. The method includes receiving sensor data output from at least three of the plurality of sensors as input to an auto-encoder; using the auto-encoder to reconstruct the received sensor data via a plurality of hidden layers, and to provide the reconstructed sensor data as output from the auto-encoder; comparing the output of the auto-encoder to the input to the auto-encoder to provide an error value, and comparing the error value to a threshold; and in response to the error value being greater than the threshold, issuing a warning signal signifying one or more signal anomalies associated with the received sensor data.

Example 21 includes the subject matter of Example 20, further comprising comparing the warning signal to a set of criteria and suppressing the warning signal if it does not meet one or more criteria in the set of criteria.

Example 22 includes the subject matter of Example 21, wherein the warning signal has characteristics that include a time period over which the warning is issued and an average severity with respect to a threat represented in the sensor data associated with the warning signal.

Example 23 includes the subject matter of Example 22, wherein the set of criteria comprises one or both of a threshold time period and a threshold average severity.

Example 24 includes the subject matter of any one of Examples 20-23, further comprising checking a legitimacy of warning signals coming from different auto-encoders against each other, and to cancel warning signals that are determined to be not legitimate.

Example 25 is a computer program product including one or more non-transitory machine-readable mediums encoded with instructions that when executed by one or more processors cause a process to be carried out for detecting one or more signal anomalies among a plurality of sensors. The process includes receiving, at an auto-encoder, sensor data output from at least three of the plurality of sensors as input; reconstructing, by the auto-encoder, the received sensor data via a plurality of hidden layers, and providing the reconstructed sensor data as output from the auto-encoder; comparing the output of the auto-encoder to the input to the auto-encoder to provide an error value, and comparing the error value to a threshold; and in response to the error value exceeding the threshold, cause issuance of a warning signal signifying one or more signal anomalies associated with the received sensor data.

Example 26 includes the subject matter of Example 25, wherein the process further comprising comparing the warning signal to a set of criteria and suppressing the warning signal if it does not meet one or more criteria in the set of criteria.

Example 27 includes the subject matter of Example 26, wherein the warning signal has characteristics that include a time period over which the warning is issued and an average severity with respect to a threat represented in the sensor data associated with the warning signal.

Example 28 includes the subject matter of Example 27, wherein the set of criteria comprises one or both of a threshold time period and a threshold average severity.

Example 29 includes the subject matter of any one of Examples 25-28, wherein the process further comprising checking a legitimacy of warning signals coming from different auto-encoders against each other, and to cancel warning signals that are determined to be not legitimate.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

What is claimed is:

1. A controller area network, comprising:
   a plurality of sensors, each of the plurality of sensors being configured to output sensor data;
   a data bus coupled to the plurality of sensors and configured to receive sensor data from the sensors; and
   a processing device coupled to the data bus, the processing device comprising
      an anomaly detection module, the anomaly detection module comprising one or more auto-encoders, wherein each auto-encoder is configured to receive sensor data from at least three of the sensors via the data bus, wherein each of the one or more auto-encoders includes five hidden layers and a number of inputs (I), wherein a first hidden layer has a first number of neurons (N1), a second hidden layer has a second number of neurons (N2), the third hidden layer is a central layer and has a third number of neurons (N3) where N3<I, a fourth hidden layer has N2 neurons and a fifth hidden layer has N1 neurons, wherein N1>N2, and a warning indicator module configured to compare an output of a given auto-encoder of the one or more auto-encoders to an input of the given auto-encoder to obtain an error value, and to compare that error value against an error threshold and, in response to the error value indicating that the error threshold has been exceeded, to issue a warning signal associated with the sensor data received by the given auto-encoder.

2. The controller area network of claim 1, wherein the processing device further comprises a selection module configured to compare the warning signal issued by the warning indicator module to a set of criteria, and to suppress the warning signal if it does not meet one or more criteria in the set of criteria.

3. The controller area network of claim 2, wherein the warning signal issued by the warning indicator module has characteristics that include a time period over which the warning is issued and an average severity with respect to a threat represented in the sensor data associated with the warning signal.

4. The controller area network of claim 3, wherein the set of criteria comprises one or both of a threshold time period and a threshold average severity.

5. The controller area network of claim 2, wherein the selection module comprises a fusion module configured to assess legitimacy of warning signals, and to cancel the warning signals that are determined to be not legitimate, wherein the warning signals originate from:
the one or more auto-encoders,
one or more anomaly detecting algorithms which are not auto-encoders, namely anomaly detecting algorithms that test signal value ranges, message arrival rates, or signal value changes over time, or any combination of the auto-encoders and the anomaly detecting algorithms.

6. The controller area network of claim 1, wherein the one or more auto-encoders comprise one or more symmetrical auto-encoders.

7. The controller area network of claim 1, wherein the plurality of sensors are coupled to a vehicle.

8. A vehicle comprising the controller area network of claim 1.

9. An anomaly detection system, comprising:
an anomaly detection circuit comprising a plurality of auto-encoders, wherein the plurality of auto-encoders receive sensor data from a plurality of sensors such that each auto-encoder of the plurality of auto-encoders receives sensor data from at least three different sensors of the plurality of sensors, wherein each of the one or more auto-encoders includes five hidden layers and a number of inputs (I), wherein a first hidden layer has a first number of neurons (N1), a second hidden layer has a second number of neurons (N2), the third hidden layer is a central layer and has a third number of neurons (N3) where N3<I, a fourth hidden layer has N2 neurons and a fifth hidden layer has N1 neurons, wherein N1>N2; and a warning indicator circuit configured to compare an output of a given auto-encoder of the plurality of auto-encoders to an input of the given auto-encoder to obtain an error value, and to compare that error value against an error threshold and, in response to the error value indicating that the error threshold has been exceeded, to issue a warning signal associated with the sensor data received by the given auto-encoder.

10. The anomaly detection system of claim 9, further comprising a selection circuit configured to compare the warning signal issued by the warning indicator circuit to a set of criteria, and to remove the warning signal if it does not meet one or more criteria in the set of criteria.

11. The anomaly detection system of claim 10, wherein the warning signal issued by the warning indicator circuit has characteristics that include a time period over which the warning is issued and an average severity.

12. The anomaly detection system of claim 11, wherein the set of criteria comprises one or both of a threshold time period and a threshold average severity.

13. The anomaly detection system of claim 9, wherein the plurality of auto-encoders comprise symmetrical auto-encoders.

14. The anomaly detection system of claim 9, further comprising the at least three different sensors, wherein the at least three different sensors are coupled to a vehicle.

15. A vehicle comprising the anomaly detection system of claim 9.

16. A method of detecting one or more signal anomalies among a plurality of sensors, the method comprising:
receiving sensor data output from at least three of the plurality of sensors as input to an auto-encoder;
using the auto-encoder to reconstruct the received sensor data via five hidden layers having number of inputs (I), wherein a first hidden layer has a first number of neurons (N1), a second hidden layer has a second number of neurons (N2), the third hidden layer is a central layer and has a third number of neurons (N3) where N3<I, a fourth hidden layer has N2 neurons and a fifth hidden layer has N1 neurons, wherein N1>N2, and to provide the reconstructed sensor data as output from the auto-encoder;
comparing the output of the auto-encoder to the input to the auto-encoder to provide an error value, and comparing the error value to a threshold; and
in response to the error value being greater than the threshold, issuing a warning signal signifying one or more signal anomalies associated with the received sensor data.

17. The method of claim 16, further comprising comparing the warning signal to a set of criteria and suppressing the warning signal if it does not meet one or more criteria in the set of criteria.

18. The method of claim 17, wherein the warning signal has characteristics that include a time period over which the warning is issued and an average severity with respect to a threat represented in the sensor data associated with the warning signal.

19. The method of claim 18, wherein the set of criteria comprises one or both of a threshold time period and a threshold average severity.

20. The method of claim 16, further comprising checking a legitimacy of warning signals coming from different auto-encoders against each other, and to cancel warning signals that are determined to be not legitimate.

21. A computer program product including one or more non-transitory machine-readable mediums encoded with instructions that when executed by one or more processors cause a process to be carried out for detecting one or more signal anomalies among a plurality of sensors, the process comprising:
   receiving, at an auto-encoder, sensor data output from at least three of the plurality of sensors as input;
   reconstructing, by the auto-encoder, the received sensor data via five hidden layers having a number of inputs (I), wherein a first hidden layer has a first number of neurons (N1), a second hidden layer has a second number of neurons (N2), the third hidden layer is a central layer and has a third number of neurons (N3) where N3<I, a fourth hidden layer has N2 neurons and a fifth hidden layer has N1 neurons, wherein N1>N2 and providing the reconstructed sensor data as output from the auto-encoder;
   comparing the output of the auto-encoder to the input to the auto-encoder to provide an error value, and comparing the error value to a threshold; and
   in response to the error value exceeding the threshold, cause issuance of a warning signal signifying one or more signal anomalies associated with the received sensor data.

22. The computer program product of claim 21, wherein the process further comprises comparing the warning signal to a set of criteria and suppressing the warning signal if it does not meet one or more criteria in the set of criteria.

23. The computer program product of claim 22, wherein the warning signal has characteristics that include a time period over which the warning is issued and an average severity with respect to a threat represented in the sensor data associated with the warning signal.

24. The computer program product of claim 23, wherein the set of criteria comprises one or both of a threshold time period and a threshold average severity.

25. The computer program product of claim 21, wherein the process further comprises checking a legitimacy of warning signals coming from different auto-encoders against each other, and to cancel warning signals that are determined to be not legitimate.

* * * * *